(12) United States Patent
Hamada et al.

(10) Patent No.: US 6,577,462 B1
(45) Date of Patent: Jun. 10, 2003

(54) METHOD AND DEVICE FOR RECORDING AND REPRODUCING DATA

(75) Inventors: Jin Hamada, Odawara (JP); Katsuhiro Tsuneta, Odawara (JP); Terumi Takashi, Chigasaki (JP); Tsuneo Hirose, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/445,217

(22) PCT Filed: Apr. 13, 1998

(86) PCT No.: PCT/JP98/01680
§ 371 (c)(1),
(2), (4) Date: Dec. 6, 1999

(87) PCT Pub. No.: WO98/57325
PCT Pub. Date: Dec. 17, 1998

(30) Foreign Application Priority Data

Jun. 11, 1997 (JP) .............................................. 9-153319

(51) Int. Cl.$^7$ ................................................ G11B 5/09
(52) U.S. Cl. ........................................... 360/51; 360/50
(58) Field of Search .............................. 360/51, 52, 50, 360/48

(56) References Cited

U.S. PATENT DOCUMENTS

| 4,001,883 A | 1/1977 | Strout et al. |
| 4,570,189 A | 2/1986 | Lode |
| 4,851,933 A | 7/1989 | Sugaya et al. |
| 4,916,577 A | 4/1990 | Dawkins |
| 5,517,371 A | 5/1996 | Takei |
| 5,606,466 A | 2/1997 | Fisher et al. |
| 5,796,534 A | * 8/1998 | Yamamoto et al. ........... 360/48 |
| 6,108,151 A | * 8/2000 | Tuttle et al. .................. 360/51 |

FOREIGN PATENT DOCUMENTS

| GB | 1495459 | 12/1977 |
| JP | 59-24408 | 2/1984 |
| JP | 61-206988 | 9/1986 |
| JP | 5-12805 | 1/1993 |
| JP | 5-120802 | 5/1993 |
| JP | 5-303836 | 11/1993 |

* cited by examiner

*Primary Examiner*—David Hudspeth
*Assistant Examiner*—Varsha A. Kapadia
(74) *Attorney, Agent, or Firm*—Antonelli, Terry, Stout & Kraus, LLP

(57) ABSTRACT

The actual data recording area on a recording medium is expanded by reducing a gap area between blocks of data for compensating for a delay time of data conversion while recording and reproducing data in a data recording and reproducing device. Based on a servo sector signal, a data sector generator circuit generates a write data sector signal indicating a timing of data recording in a data recording area, and outputs the write data sector signal to a delay circuit and a selector having two input ports and one output port. The delay circuit generates a read data sector signal by delaying the write data sector signal by a certain period, and outputs the read data sector signal to the selector. The selector outputs the write data sector signal when a write mode signal is active, and outputs the read data sector signal when the write mode signal is inactive.

8 Claims, 4 Drawing Sheets

METHOD AND DEVICE FOR RECORDING AND REPRODUCING DATA

TECHNICAL FIELD

This invention is related to data storage and retrieval device which utilizes magnetic disk, magneto optical disk, optical disk, and magnetic tape etc. Especially this invention is related to data storage and retrieval control method in which inter sector gap area is reduced while data recording and reproducing, and also related to device using it.

BACKGROUND ART

Data recording and reproducing method of conventional data storage and retrieval device is disclosed with an example of magnetic disk device. However the present invention is effective not only in magnetic disk device but also various data storage and retrieval devices in which a train of data is separated to one or more blocks and recorded to the data recording medium with arranging a gap before or after each sector, and data reproducing is performed through a reproducing head which faces and moves against said recording medium.

In a magnetic disk device, concentrically shaped recording area called track is arranged on a magnetic disk namely the recording medium, and data recording and reproducing is performed by the information on the track. Servo area is arranged intermittently and periodically on this track, and data area is also arranged between the servo area. Said data recording area usually consists of plural of data sectors. Between the sectors, there are gap area which compensates the rotational speed deviation or delay time of the operation of electronic circuit. Accordingly data cannot be recorded here.

Each sector consists of ID portion and data portion. ID portion consists of synchronizing pattern to distinguish data while data reproducing, ID information to identify the data sector, and error check codes to detect the ID information error. Data portion consists of synchronizing pattern to distinguish data while data reproducing, data information, and error correction code (ECC) etc.

Recording and reproducing circuit which performs recording and reproducing of data on said data portion consists of read circuit, write circuit, and data control circuit. Read circuit handles reproducing of signal from ID portion and data portion. Write circuit handles recording the signal to data portion. Based on the servo sector signal of said servo area, data control circuit generates data sector signal which is activated at the start point of synchronizing pattern of ID portion, and controls overall recording and reproducing operation of the device.

A data recording procedure is as follows: ID data is reproduced with reference to the data sector signal as the origin, it is confirmed that the reproduced ID data identifies the correct sector to be recorded, and write data is recorded by the write circuit. A data reproducing procedure is as follows: ID data is reproduced, it is confirmed that the reproduced ID data identifies the correct sector to be reproduced, the following data area is read back by the read circuit, and the desired data of the sector is obtained.

Further, detail procedure is described as follows. Read gate signal is activated by the data control circuit at the appropriate timing during the synchronizing pattern area of the ID portion with referring to the data sector signal as the origin. Read circuit synchronizes with the signal recorded in ID portion, decodes the reproduced signal to data, gets the ID information, and transmits the ID data to data control part. Data control circuit verifies the error check code of ID information and temporarily closes the read gate, then reactivates the read gate signal at an appropriate timing during the synchronizing pattern of the data portion after ID portion. Read circuit synchronizes with data portion, decodes the reproduced signal, and transmits the reproduces data to data control circuit. After decoding error correction code portion (ECC) of data portion, data control circuit closes the read gate, and shifts to a status of waiting the data sector signal for decoding next ID portion.

In a series of data recording and reproducing operation, gap areas are arranged between data sectors, or before and after ID portion and data portion, in order to compensate the deviation of recording position which is caused from the rotational speed deviation of magnetic disk which is the recording medium in magnetic disk device, or the deviation of tape running speed in magnetic tape drive, and to compensate the delay in data recording operation of write circuit, or the delay in data reproducing operation of read circuit.

In most cases, the rotation of magnetic disk is controlled based on a clock signal generated by a crystal oscillator, so that usually the rotational speed is stable. However when the device is exposed to a shock or vibration, or when seek operation occurs, the rotational speed of the disk varies because of the deviation of the power voltage or mechanical resonance from seek operation. In such cases the amount of the deviation of the rotational speed is about 0.1%. Above mentioned gap areas were necessary to avoid the data destruction from the deviation of the rotational speed.

Delay time in operation of write or read circuit varies according to the data conversion method (coding format) or the reproducing method of reproducing the data recorded on the data storage medium (here magnetic disk). As for the coding method, recently more efficient block coding method such as 8 to 9 coding method or 16 to 17 coding method is generally used instead of formerly used 2 to 7 RLL or 1 to 7 RLL. As for the reproducing method, PRML method (Partial Response Maximum-Likelihood) or EPRML (Extended Partial Response Maximum-Likelihood) is generally used in order to obtain the better signal to noise ratio. With the increasing complexity of the data conversion method or signal reproducing method, coding or decoding time increases, accordingly the operation time (delay time in data recording or reproducing) required the reproduced data to reach to data control circuit from read circuit increases. Now data control circuit cannot start the operation of next data portion or ID portion until ECC decoding operation of the reproduced data finishes. So gap area to wait the delay time of write or read circuit was necessary before and after the data portion or ID portion.

Track format in the conventional magnetic disk device is shown in FIG. 7. Recording and reproducing operation of data is performed depending on one data sector signal (for write and read) as timing signal. Servo area and SYNC pattern, those are necessary to record and reproduce data on data area, data recording area, gap area to compensate rotational speed deviation, and gap area to compensate the operation time (data conversion delay time) of write or read circuit are intermixedly arranged on the track. And there are time delay each between write data to be recorded on the recording medium, actually recorded data on the medium, and reproduced data respectively.

A method to delay the output of index signal and sector signal except formatting in order to avoid write splicing is disclosed in unexamined patent publication 5-303836 Japan. However only the timing of generating the sector signal is changed between formatting and not formatting, but there is no effect to reduce above mentioned gap area (namely the area cannot be used to store data).

In a magnetic disk device by the prior technology, starting of write or read operation of data is triggered by the data sector signal generated from servo signal. The data sector signal was generated at the same timing for both writing and reading data. In such above mentioned prior control method of data recording and reproducing, said gap area is determined by the total of the deviation of relative speed (rotational) of the medium, the delay in write operation, and the delay in read operation. Originally the gap area cannot be used for data recording. Accordingly by increasing the gap area, the actual data recording area decreases.

DISCLOSURE OF THE INVENTION

The purpose of the present invention is to eliminate the portion of gap area which is useless to store the data, so that to increase the substantial data recording area of the recording medium. Another purpose of the present invention is to reduce the portion of gap area with which the delay time of read or write operation is compensated, so that the efficiency of the data recording is improved.

In the data recording and reproducing method by the present invention, to achieve the above mentioned object, data sector signal generating means is provided where the timing of generating the data sector signal of data recording and reproducing is different. Here data sector signal is generated for each sector. Said data sector signal generating method can issue the two kinds of data sector signal either by changing the timing from one source signal or from pre-arranged two source signal of the different timing.

Further, in order to reduce the gap portion which compensates the delay time of read operation, it is provided with data sector generating means which generates data sector signal to start the data reading of the next sector before completing the data output operation of the current sector, and data reproducing means.

Or, it may be provided with data sector generating means which starts synchronizing with sync pattern and reproducing, before completing the data output operation of the current sector, and data reproducing means.

In order to reduce the gap portion which compensates the delay time of write operation, it is provided with data sector generating means which generates data sector signal to start the data writing for the next sector before completing the data output of current sector. Consequently, the gap area is substantially eliminated, and the data recording efficiency on the recording medium can be improved.

BEST MODE FOR CARRYING OUT THE INVENTION

Figure 1:
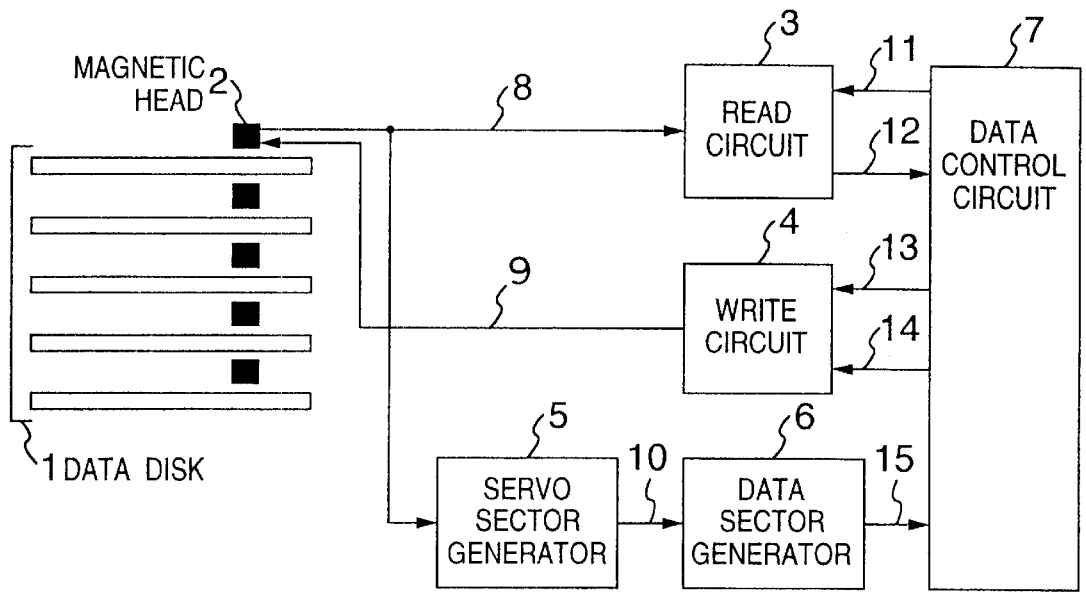
FIG. 1 is a block diagram of a magnetic disk device by the present invention.

FIG. 1 is a block diagram of a magnetic disk device which is an embodiment of the present invention. Reproducing and recording operation is disclosed.

Data reproducing operation is as follows. Data and servo information stored in the data disk 1 is read back as analog read signal 8 (head play back signal 8) and is inputted to read circuit 3 and servo sector generator 5.

Based on the servo information in read back signal 8, Servo sector generator 5 outputs servo sector signal 10 which shows start point of servo information recording area to data sector generator 6. Following servo sector signal 10, data sector generator 6 outputs data sector signal 15 (digital signal) which indicates the base timing for recording and reproducing to and from the data recording area. Data sector signal 15 is inputted to data control circuit 7, and based on data sector signal 15, data control circuit 7 outputs read gate 11 which is a digital signal and determines the area to import the data. While read gate 11 is active, read circuit 3 decodes reproduced signal 8 and output to data control circuit 7 as read data 12.

Here, trigger signal 10 which indicates the origin of any recording area can be issued by trigger signal generator 5 (not shown) to data generator 6 (not shown), and origin trigger signal 15 can be issued to data control circuit 7.

Then, the procedure of data recording operation is disclosed. Data recording procedure performed based on data sector signal 15 like reproducing procedure. Above mentioned and not shown origin trigger signal 15 can also be used.

Data control circuit 7 issues write gate 13 which is digital and determines the data recording area based on the data sector signal 15 which is issued from data sector generator 6. Further, data control circuit 7 outputs write data 14 to write circuit 4 while write gate 13 is active. Write circuit 4 receives write gate 13 and write data 14, encodes write data 14, and records analog converted write data 9 to data disk 1 through magnetic head.

Figure 2:
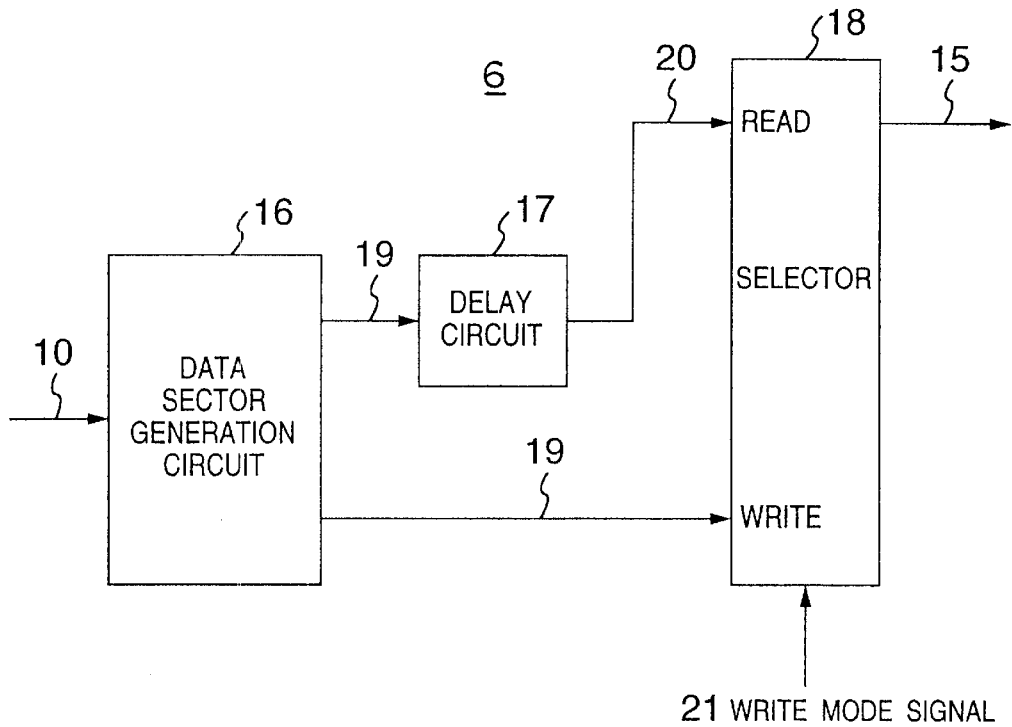
FIG. 2 is a block diagram which shows a configuration of data sector generator 6 in FIG. 1.

Data sector generator 6 in the functional block diagram FIG. 1 is further described referring to FIG. 2.

Data sector generator 16 generates write data sector signal 19 based on the input of servo sector signal 10. Write data sector signal 19 indicates the timing of recording the data to data recording area on the medium.

Write data sector signal 19 is transmitted to delay circuit 17 and selector 18 which has 2 input port and 1 output port. Delay circuit 17 outputs read data sector signal 20 which is a certain period delayed signal of write data sector signal 19. These two signals are inputted to selector 18. Selector 18 outputs write data sector signal 19 as data sector signal 15 when write mode signal 21 is active, and outputs read data sector signal 20 as data sector signal 15 when write mode signal 14 is inactive.

Figure 5:
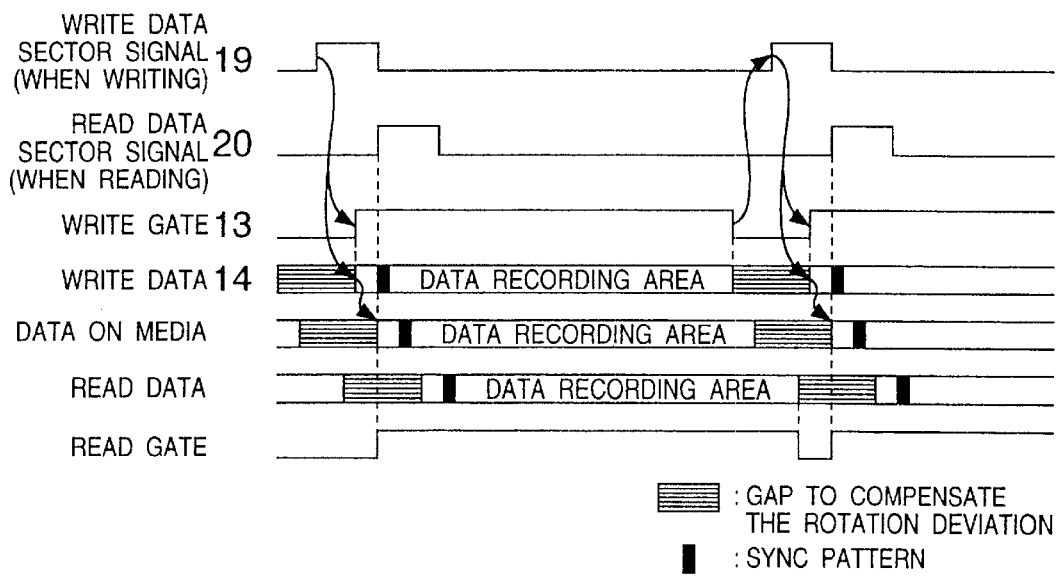
FIG. 5 shows the timing of reading and writing in the present invention.

Further, the circuit configuration is not limited as above. That means, only generating each signal as shown in FIG. 5 is necessary. One way is to provide the data control circuit with above mentioned function, and to transmit the write data sector signal in whether delayed of certain period or write data sector signal 19 itself depending on the existence or no-existence of write mode signal 21, in either synchronously or a synchronously with a clock which is generated separately. Another way is to provide an additional control circuit to perform the same function.

Here, timing of the procedure of write and read operation is shown in FIG. 5.

When a magnetic disk device performs write operation, write mode signal 21 (FIG. 2) is active and data sector signal 15 indicates the timing signal to write data sector signal 19. Data control circuit 7 outputs write gate 13 and write data 14 based on data sector signal 15 (write data sector signal 19), and the information is written on to the data disk 1. Because of the operation delay of write circuit 4, recording position lag occurs on data disk 1. Accordingly the write data sector signal 19 is asserted earlier with the delay time of write circuit 4. The following write data sector signal 19 is re-asserted after transmitting the write data and passing the gap period to compensate the deviation of rotation. According to these means, the gap area includes only the portion to compensate the deviation of rotation, and no portion for the delay of prior write operation is included in the gap area.

On the other hand when a magnetic disk performs read operation, write mode signal 21 is inactive, and data sector signal 15 is the timing signal indicated to read data sector signal 20. Read data sector signal 20 is asserted at delayed timing with write data sector signal 19, and is generated at the start position of data recording area of the medium (FIG. 5). Read data 12 is transmitted to data control circuit 7 after the delayed operation of read circuit 3.

In case delay time of read operation is less than the time of gap area to compensate the rotational deviation, namely less than the time for the magnetic head passes said gap area, the delay time of read operation is covered up. Consequently the gap area is not required to include the delay time of read operation, so that the gap area can be reduced compared to the prior technology.

Further the operation time after the issue of read command until the actual start of read operation of the data on the medium, or operation time to store the data can be compensated similarly. To be more detail, the gap area on the medium can be eliminated by anticipation control of the data control circuit with reflecting the time after starting the input of reproduced signal 8 to read circuit 3 and servo sector generator 5 until it is converted to the information which the data control circuit can distinguish, or the time after starting the transmit of the write data 14 to write circuit 4 until the starting of recording the magnetic field change which corresponds to the write analogue signal to the recording medium.

With another method than data sector generation circuit 16 of the present embodiment, it is possible to achieve the similar object. For example, similar function can be obtained by providing two kind of circuit in data sector generation circuit 16, that is write data sector generation circuit and read data sector generation circuit, write data sector signal and read data sector signal are generated, and outputting one of the two signals as the data sector signal. The only required is that the timing between each signal is as shown in FIG. 5.

Figure 3:
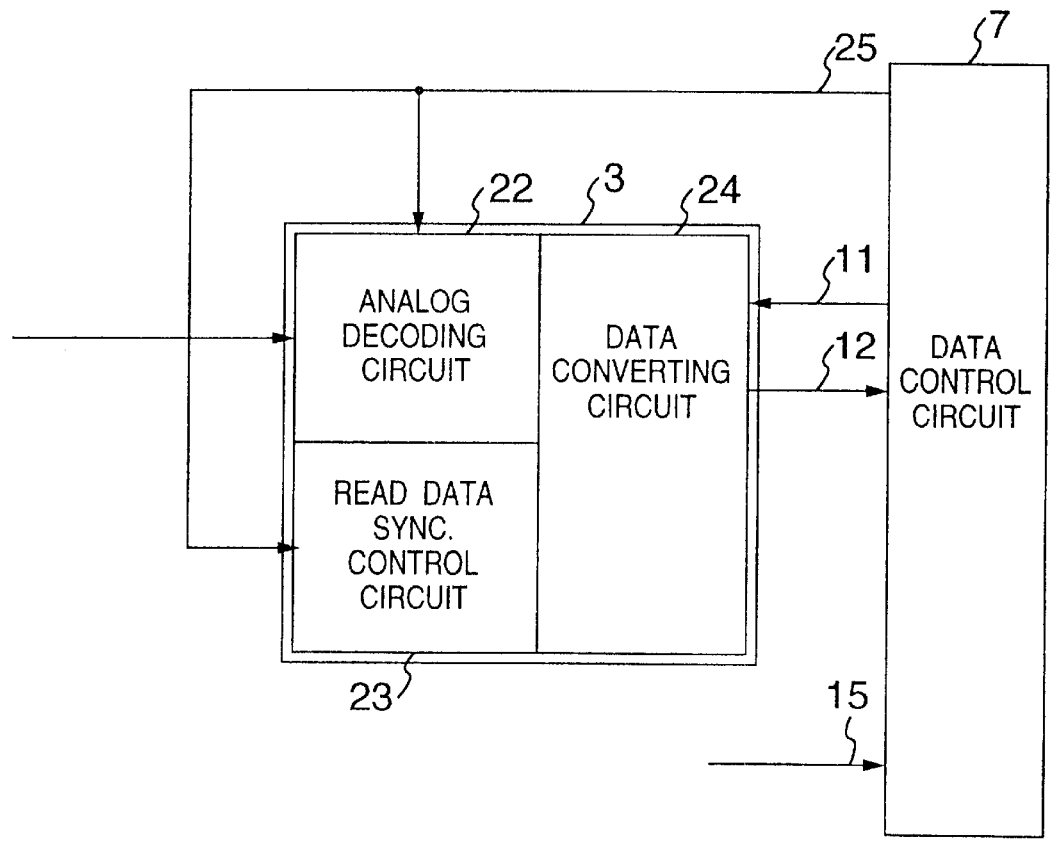
FIG. 3 is a block diagram which shows a configuration of the read circuit 3 in FIG. 1.

Then, when the read operation delay time is larger than the time which the magnetic head passes the corresponding gap area, an operational circuit is required as shown in FIG. 3. More detailed configuration of read circuit 3 and data control circuit 7 in FIG. 1 is shown in FIG. 3. Read circuit 3 consists of analog decoder 22, read data synchronous control circuit 23 and data conversion circuit 24.

Figure 6:
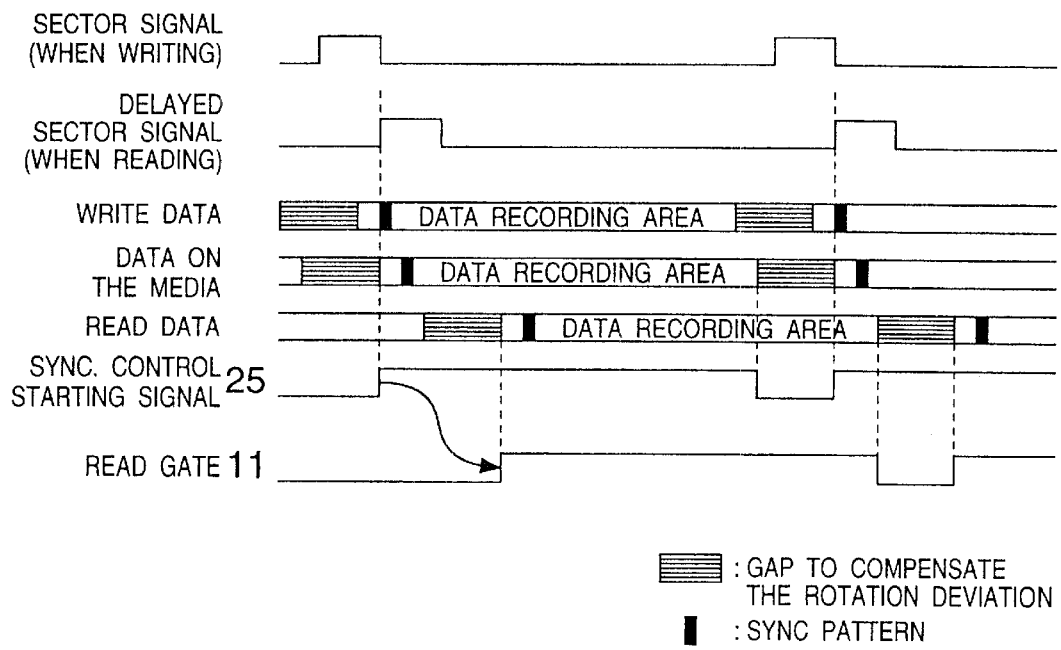
FIG. 6 shows the timing of the read operation by the present invention.
Figure 7:
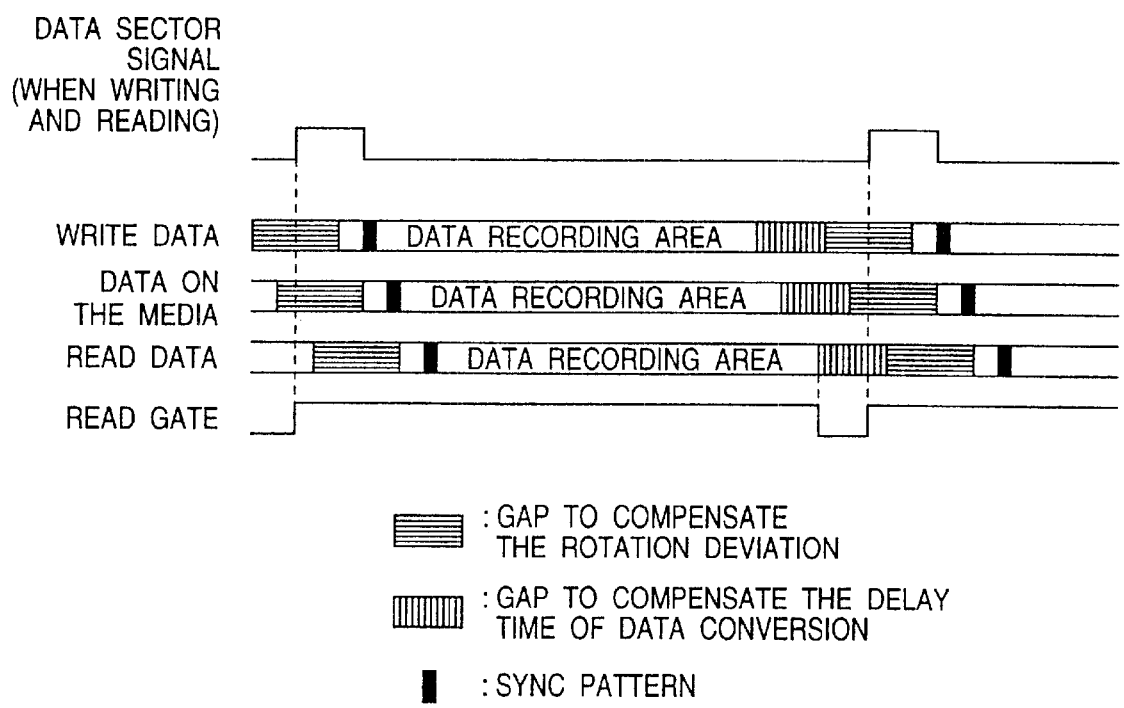
FIG. 7 shows the timing of reading and writing in the prior technology.

Operational timing is shown in FIG. 6.

During read operation, based on data sector signal 15, data control circuit 7 generates sync control start signal 25 from either the fall of write sector signal or the rise of read delay selector signal, and also generates read gate 11 with the delayed timing of the rise of write sector signal. Sync control start signal 25 (FIG. 3) is transmitted to analog decoder circuit 22 and read sync control circuit 23. Read gate 11 is transmitted to data conversion circuit 24. When sync control start signal 25 is activated, reproduced analog signal 8 is decoded through analog decoder circuit 22.

Decoded data is inputted to data conversion circuit 24 and read data sync control circuit 23. Read data sync control circuit 23 performs phase synchronizing of data with the sync pattern of reproduced signal 8, and generates the reproducing clock signal. Decoded data is inputted to data conversion circuit 24 with synchronizing the reproducing clock signal, and the data code is converted and outputted to data control circuit 7 as read data 12.

Data control circuit 7 inactivates the sync control start signal 25 (FIG. 6) when analog decoder circuit 22 finishes the processing of reproduced signal 8, and inactivates read gate 11 when the output of all read data 12 is finished. After all, in case reproducing operation is performed continuously, sync control start signal 25 is inactivated when processing of all the data in one sector by analog decoder circuit is completed. Accordingly even though data transfer to data control circuit 7 is not completed yet, by starting to wait the next sync control start signal at the timing of sync control start signal 25 is inactivated, the data decoding and sync control can be started when sync control signal 25 is activated by next data sector signal 15.

By employing the present invention, even if the delay time of the read operation exceeds the time of the gap area, the gap area does not include a portion of the read operation, so that the purpose of the invention is achieved.

Further, the circuit configuration is not limited as above. That means, only generating each signal as shown in FIG. 6 is necessary. One way is to provide the data control circuit with above mentioned function, and another is to provide a separate control circuit to perform the same function.

Figure 4:
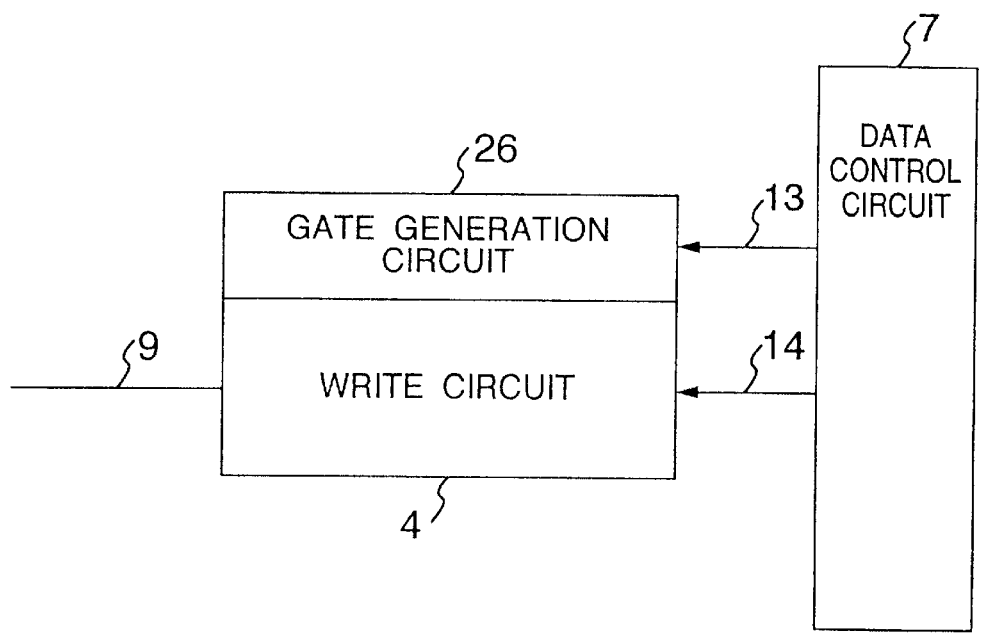
FIG. 4 is a block diagram which shows a configuration of the write circuit 4 in FIG. 1.

Next, in FIG. 4 another embodiment of a circuit is disclosed where said gap area caused from the delay of write circuit is reduced.

In FIG. 4, gate generation circuit 26 is provided to write circuit 4 of FIG. 1. From write gate signal 13 (FIG. 5) which indicates the outputting period of digital data 14, gate generation circuit 26 generates write gate with reflecting the delay time of data code conversion of write data 14. That is, though the write gate signal 13 is closed at completion of the transmitting of the write data 14 from data control circuit 7 to write circuit 4, gate generation circuit 26 keeps write gate depending on write gate signal 13 until the completion of the recording to the recording medium (disk). Accordingly, write circuit 4 can continue to transmit coded recording data 9 (analog signal) to magnetic head.

In the present embodiment, it is described referring to magnetic disk device. However, gap area reduction can be obtained by similar function not only in magnetic disk devices but also in optical disk devices or magnetic tape devices.

The method by the present invention can be applied to not only data recording and reproducing devices but also the components which composes the relevant devices such as LSIs of data recording and reproducing circuits or control circuits. Further, similar function can also be achieved by micro CPU.

In the data recording and reproducing method by the present invention, timing compensation is introduced to relatively cancel the delay time in write and read operation, so that the gap portion to compensate the delay time of data processing can be eliminated or reduced. Consequently, improvement of the efficiency or data recording, namely the expansion of the substantial data recording area on the recording medium can be obtained.

What is claimed is:

1. A data recording and reproducing device comprising:
    data recording means which records data divided into a plurality of blocks on a recording medium such that there is a gap area before or after each of the blocks;
    data reproducing means which reproduces data from the recording medium with a reproducing head to obtain reproduced data; and
    decoding means which decodes the reproduced data to obtain decoded data and outputs the decoded data;
    wherein a time required for the reproducing head to pass the gap area is shorter than a time required for the decoding means to decode the reproduced data;
    wherein the data recording means records data in one block based on a write data sector signal corresponding to the block;
    wherein the data reproducing means reproduces data from one block based on a read data sector signal corresponding to the block; and
    wherein a timing of the read data sector signal relative to the block is different from a timing of the write data sector signal relative to the block.

2. A data recording and reproducing method comprising the steps of:
    recording data divided into a plurality of blocks on a recording medium such that there is a gap area before or after each of the blocks;
    reproducing data from the recording medium with a reproducing head to obtain reproduced data;
    decoding the reproduced data to obtain decoded data; and
    outputting the decoded data;
    wherein a time required for the reproducing head to pass the gap area is shorter than a time difference between a start of the decoding step and a start of the outputting step;
    wherein in the recording step, data is recorded in one block based on a write data sector signal corresponding to the block;
    wherein in the reproducing step, data is reproduced from one block based on a read data sector signal corresponding to the block; and
    wherein a timing of the read data sector signal relative to the block is different from a timing of the write data sector signal relative to the block.

3. A data recording and reproducing device comprising:
    data recording means which records data divided into a plurality of blocks on a recording medium such that there is a gap area before or after each of the blocks;
    data reproducing means which reproduces data from the recording medium with a reproducing head to obtain reproduced data; and
    decoding means which decodes the reproduced data to obtain decoded data and outputs the decoded data;
    wherein the decoding means starts decoding reproduced data reproduced from a second block before the decoding means finishes outputting decoded data obtained by decoding reproduced data reproduced from a first block;
    wherein the data recording means records data in one block based on a write data sector signal corresponding to the block;
    wherein the data reproducing means reproduces data from one block based on a read data sector signal corresponding to the block; and
    wherein a timing of the read data sector signal relative to the block is different from a timing of the write data sector signal relative to the block.

4. A data recording and reproducing method comprising the steps of:
    recording data divided into a plurality of blocks on a recording medium such that there is a gap area before or after each of the blocks;
    reproducing data from the recording medium with a reproducing head to obtain reproduced data;
    starting decoding the reproduced data to obtain decoded data;
    starting outputting the decoded data as the decoding of the reproduced data progresses;
    finishing decoding the reproduced data; and
    finishing outputting the decoded data;
    wherein finishing outputting decoded data obtained by decoding reproduced data reproduced from a first block is performed after starting decoding reproduced data reproduced from a second block;
    wherein in the recording step, data is recorded in one block based on a write data sector signal corresponding to the block;
    wherein in the reproducing step, data is reproduced from one block based on a read data sector signal corresponding to the block; and
    wherein a timing of the read data sector signal relative to the block is different from a timing of the write data sector signal relative to the block.

5. A data recording and reproducing device comprising:
    data recording means which records data divided into a plurality of blocks on a recording medium after relevant data is conversion processed by a write circuit such that there is a gap area before or after each of the blocks;
    data reproducing means which reproduces data from the recording medium with a reproducing head to obtain reproduced data; and
    decoding means which decodes the reproduced data to obtain decoded data and outputs the decoded data;
    wherein during data recording, a timing of starting the write circuit is earlier than a timing of starting the decoding means;
    wherein the data recording means records data in one block based on a write data sector signal corresponding to the block;
    wherein the data reproducing means reproduces data from one block based on a read data sector signal corresponding to the block; and
    wherein a timing of the read data sector signal relative to the block is different from a timing of the write data sector signal relative to the block.

6. A data recording and reproducing method comprising the steps of:
    recording data divided into a plurality of blocks on a recording medium such that there is a gap area before or after each of the blocks;

reproducing data from the recording medium with a reproducing head to obtain reproduced data;

starting decoding the reproduced data; and starting a write circuit which conversion processes decoded data during data recording;

wherein a timing of starting decoding the reproduced data is later than a timing of starting the write circuit when recording or reproducing data of one block;

wherein in the recording step, data is recorded in one block based on a write data sector signal corresponding to the block;

wherein in the reproducing step, data is reproduced from one block based on a read data sector signal corresponding to the block; and wherein a timing of the read data sector signal relative to the block is different from a timing of the write data sector signal relative to the block.

7. A data recording and reproducing device comprising:

data recording means which records data divided into a plurality of blocks on a recording medium after relevant data is conversion processed by a write circuit such that there is a gap area before or after each of the blocks based on a write gate generated by a write gate generating circuit in response to a write gate signal;

data reproducing means which reproduces data from the recording medium with a reproducing head to obtain reproduced data; and decoding means which decodes the reproduced data to obtain decoded data and outputs the decoded data;

wherein during data recording, even when the write gate signal is terminated, the write gate generating circuit continues to generate the write gate so that data continues to be recorded on the recording medium based on the write gate until recording of the data is completed;

wherein the data recording means records data in one block based on a write data sector signal corresponding to the block;

wherein the data reproducing means reproduces data from one block based on a read data sector signal corresponding to the block; and wherein a timing of the read data sector signal relative to the block is different from a timing of the write data sector signal relative to the block.

8. A data recording and reproducing method comprising the steps of:

recording data divided into a plurality of blocks on a recording medium such that there is a gap area before or after each of the blocks;

reproducing data from the recording medium with a reproducing head to obtain reproduced data; and starting a write circuit which conversion processes relevant data for recording on the recording medium;

wherein the write circuit continues to operate until recording of conversion processed data for one block has been completed;

wherein in the recording step, data is recorded in one block based on a write data sector signal corresponding to the block;

wherein in the reproducing step, data is reproduced from one block based on a read data sector signal corresponding to the block; and wherein a timing of the read data sector signal relative to the block is different from a timing of the write data sector signal relative to the block.

* * * * *